United States Patent [19]
Hayashi et al.

[11] Patent Number: 4,845,951
[45] Date of Patent: Jul. 11, 1989

[54] STATIC HYDRAULIC CONTINUOUSLY VARIABLE TRANSMISSION

[75] Inventors: Tsutomu Hayashi, Tokyo; Kazuhito Ito, Saitama; Yoshihiro Yoshida; Mitsuru Saito, both of Tokyo, all of Japan

[73] Assignee: Honda Giken Kogyo Kabushiki Kaisha, Tokyo, Japan

[21] Appl. No.: 150,442

[22] Filed: Feb. 5, 1988

Related U.S. Application Data

[63] Continuation of Ser. No. 94,040, Sep. 1, 1987, abandoned, which is a continuation of Ser. No. 879,594, Jun. 27, 1986, abandoned.

[30] Foreign Application Priority Data

Jun. 28, 1985 [JP] Japan .................. 60-142253
Jul. 17, 1985 [JP] Japan .................. 60-157790

[51] Int. Cl.⁴ .............................. F16D 39/00
[52] U.S. Cl. ..................... 60/488; 60/489; 60/494; 91/437; 91/461; 91/506; 188/300
[58] Field of Search .......... 91/461, 437, 438, 506; 60/487, 488, 489, 490, 468, 494; 137/636, 625.69; 188/300; 267/64.12

[56] References Cited

U.S. PATENT DOCUMENTS

| | | | |
|---|---|---|---|
| 24,317 | 5/1857 | Schott | 60/53 |
| 1,533,399 | 4/1925 | Dunlap . | |
| 2,388,462 | 11/1945 | Beeh | 103/173 |
| 2,395,980 | 3/1946 | Wahlmark | 91/506 X |

(List continued on next page.)

FOREIGN PATENT DOCUMENTS

| | | |
|---|---|---|
| 143921 | 12/1935 | Australia . |
| 23390 | 8/1936 | Australia . |
| 143400 | 5/1950 | Australia . |
| 231526 | 4/1959 | Australia . |
| 268529 | 11/1963 | Australia . |
| 240661 | 6/1965 | Australia . |
| 317649 | 12/1919 | Fed. Rep. of Germany . |
| 880989 | 7/1949 | Fed. Rep. of Germany . |
| 1200135 | 9/1965 | Fed. Rep. of Germany . |
| 1480553 | 6/1969 | Fed. Rep. of Germany . |
| 1500480 | 7/1969 | Fed. Rep. of Germany . |
| 1625039 | 5/1970 | Fed. Rep. of Germany . |
| 3139191 | 4/1983 | Fed. Rep. of Germany . |
| 791714 | 10/1935 | France . |
| 32-7159 | of 1957 | Japan . |
| 41-3208 | of 1966 | Japan . |
| 46-11852 | 3/1971 | Japan . |
| 56-143856 | 11/1981 | Japan . |
| 57-70968 | 5/1982 | Japan . |
| 59-38467 | 9/1984 | Japan . |
| 473997 | of 1969 | Switzerland . |
| 535555 | 4/1941 | United Kingdom . |
| 574991 | 1/1946 | United Kingdom . |
| 835936 | 5/1960 | United Kingdom . |
| 902978 | 8/1962 | United Kingdom . |
| 1021873 | 3/1966 | United Kingdom . |
| 1222200 | 2/1971 | United Kingdom . |
| 1282094 | 7/1972 | United Kingdom . |
| 2104976 | 3/1983 | United Kingdom . |

Primary Examiner—Edward K. Look
Attorney, Agent, or Firm—Lyon & Lyon

[57] ABSTRACT

A static hydraulic continuously variable transmission includes a cylinder block which is secured to an output shaft and comprises a pump cylinder of a hydraulic pump and a motor cylinder of a hydraulic motor, these cylinders being connected to each other, wherein, a number of pump cylinder bores and a number of motor cylinder bores are annularly arranged respectively in the pump cylinder and the motor cylinder and the transferring of a working oil between the group of the pump cylinder bores and the group of the motor cylinder bores is conducted through the medium of a pair of oil chambers which are concentrically provided around the output shaft communincation between these cylinder bores is controlled by a number of first and second dispensing valves extending between both the oil chambers and adapted to be reciprocally radially moved. There is no relatively sliding portion between the pump cylinder and the motor cylinder, making the transferring of the working oil reliable and providing a high transmitting efficiency.

28 Claims, 11 Drawing Sheets

U.S. PATENT DOCUMENTS

| | | |
|---|---|---|
| 2,570,843 | 10/1951 | Orshansky . |
| 2,617,360 | 11/1952 | Barker . |
| 2,651,386 | 9/1953 | Rossell ................................ 188/98 |
| 2,662,375 | 12/1953 | Postel ................................. 60/53 |
| 2,683,421 | 7/1954 | Woydt ............................... 103/161 |
| 2,844,002 | 7/1958 | Pavesi ................................. 60/53 |
| 2,907,230 | 10/1959 | Kollmann ........................... 74/687 |
| 2,984,070 | 5/1961 | Bauer .................................. 60/53 |
| 3,036,434 | 5/1962 | Mark .................................... 60/53 |
| 3,054,263 | 9/1962 | Budzich ............................... 60/53 |
| 3,084,633 | 4/1963 | Henrichsen . |
| 3,131,539 | 5/1964 | Creighton ........................... 60/53 |
| 3,133,418 | 5/1964 | Froebe ................................. 60/53 |
| 3,143,858 | 8/1964 | Roeske ................................ 60/53 |
| 3,165,892 | 1/1965 | Roberts ............................... 60/53 |
| 3,170,297 | 2/1965 | Larson ................................. 60/53 |
| 3,175,363 | 3/1965 | Molly .................................. 60/53 |
| 3,187,868 | 6/1965 | Gantzer .............................. 192/101 |
| 3,213,619 | 10/1965 | Creighton ........................... 60/53 |
| 3,274,947 | 9/1966 | Jonkers .............................. 103/162 |
| 3,295,459 | 1/1967 | Griffith . |
| 3,313,108 | 4/1967 | Allgaier ............................... 60/53 |
| 3,314,234 | 4/1967 | Orshansky . |
| 3,382,813 | 5/1968 | Schauer .............................. 103/162 |
| 3,406,721 | 10/1968 | Jenney ............................ 137/625.69 |
| 3,416,312 | 12/1968 | Margolin ........................ 91/506 X |
| 3,543,514 | 12/1970 | Reimer ................................ 60/53 |
| 3,620,130 | 11/1971 | Roberts ............................... 91/506 |
| 3,698,189 | 10/1972 | Reimer .............................. 60/489 |
| 3,834,164 | 9/1974 | Ritter ................................. 60/492 |
| 4,080,992 | 3/1978 | Niederer ........................... 137/636 |
| 4,120,540 | 10/1978 | Devlieg ......................... 137/625.69 |
| 4,170,279 | 10/1979 | Pelletier ............................ 188/300 |
| 4,187,877 | 2/1980 | Hodgson et al. ............... 91/446 X |
| 4,444,093 | 4/1984 | Koga et al. ......................... 91/488 |
| 4,478,134 | 10/1984 | Kawahara . |
| 4,735,050 | 4/1988 | Hayashi . |
| 4,741,251 | 5/1988 | Hayashi . |
| 4,745,748 | 5/1988 | Hayashi . |
| 4,748,898 | 6/1988 | Hayashi . |

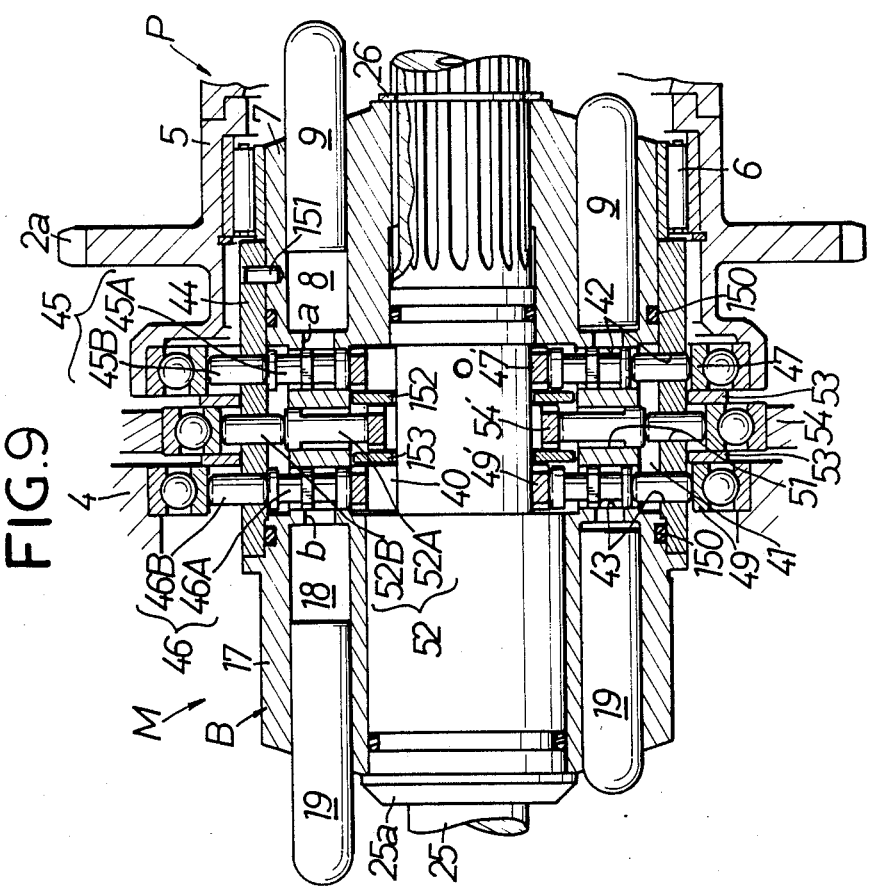
FIG.9
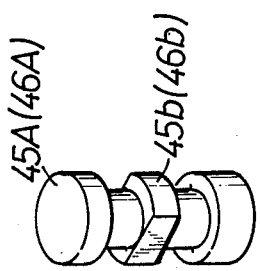
FIG.10
FIG.11

STATIC HYDRAULIC CONTINUOUSLY VARIABLE TRANSMISSION

This application is a continuation of application Ser. No. 094,040 filed 9/1/87 which is a continuation of co-pending application Ser. No. 879,594 filed on June 27, 1986, now abandoned.

BACKGROUND OF THE INVENTION

1. Field of the Invention

The present invention relates to a static hydraulic continuously variable transmission in which a hydraulic closed circuit is formed between a swashplate type hydraulic pump and a swashplate type hydraulic motor.

2. Description of the Prior Art

Such a static hydraulic continuously variable transmission is known, for example, as described in Japanese Patent Publication No. 38467/84.

In the conventional static hydraulic continuously variable transmission, a pump cylinder of a hydraulic pump is rotatably and slidably disposed to bear against a dispensing board fixedly mounted on a motor cylinder of a hydraulic motor, so that the transferring of a working oil from one to another between the hydraulic pump and the hydraulic motor is conducted through an oil passage penetrating the rotational slide surfaces of the pump cylinder and the dispensing board. Therefore, the hydraulic oil is liable to leak from the space between the respective opposed rotational slide surfaces of the dispensing board and the pump cylinder, resulting in a reduction in transmitting efficiency.

SUMMARY OF THE INVENTION

It is an object of the present invention to provide a static hydraulic continuously variable transmission as described above in which the transferring of a working oil can be reliably conducted from one to another between the hydraulic pump and the hydraulic motor and which has a higher transmitting efficiency and moreover, is easy to fabricate.

According to the present invention, the above object is accomplished by providing such a static hydraulic continuously variable transmission, wherein a cylinder block comprised of a pump cylinder in the hydraulic pump and a motor cylinder in the hydraulic pump which are interconnected is secured to an output shaft; a pair of annular oil chambers are concentrically defined around the output shaft between a number of annularly arranged cylinder bores of the pump cylinder and a number of annularly arranged cylinder bores of the motor cylinder; a number of first dispensing valves and a number of second dispensing valves are radially arranged respectively, the first dispensing valves being adapted to be reciprocally moved between radially outer and inner positions to alternately bring the number of cylinder bores of the pump cylinder into communication with the oil chambers, respectively, and the second dispensing valves being adapted to be reciprocally moved between radially outer and inner positions to alternately bring the number of cylinder bores of the motor cylinder respectively into communication with the oil chambers; a common first eccentric ring is engaged with the individual first dispensing valves for imparting the reciprocal movement to the first dispensing valves with the relative rotation between the cylinder block and an input member of the hydraulic pump; and a common second eccentric ring is engaged with the individual second dispensing valves for imparting the reciprocal movement to the second dispensing valves with the rotation of the cylinder block; whereby each cylinder bore of the pump cylinder is brought into communication with one of the oil chambers during the discharge stroke thereof and with the other chamber during the suction stroke thereof, while each cylinder bore of the motor cylinder is brought into communication with said one oil chamber during the expansion stroke thereof and with the other chamber during the contraction stroke thereof.

With the above arrangement, the higher pressure working oil delivered from the cylinder bores in the discharge stroke of the hydarulic pump is passed through the first dispensing valves into one of the oil chambers and then supplied through the second dispensing valves into the cylinder bores in the expansion stroke of the hydraulic motor. On the other hand, the lower pressure working oil discharged from the cylinder bores in the constraction stroke of the hydraulic motor is passed through the other second dispensing valves into the other oil chamber and then drawn into the cylinder bores in the suction stroke of the hydraulic pump. In this way, the transferring of the working oil from one to another between the hydraulic pump and the hydraulic motor can be conducted without necessitating the relative rotation of the pump cylinder and the motor cylinder and moreover, the leakage of the working oil is extremely small in each reciprocally moving dispensing valve. Therefore, the transferring of the working oil is reliable, leading to a great improvement in transmitting efficiency.

In addition to the above arrangement, if a discharge port of a supplement pump is connected to the other oil chamber, through the medium of which the working oil is transferred between the pump cylinder and the motor cylinder, through a check valve for blocking the issuing of the working oil out of the other oil chamber, during positive or normal load operation in which the power transmission is conducted from the hydraulic pump to the hydraulic motor, the discharged pressure from the supplement pump continues to act on the other oil chamber which has been under a lower pressure. And hence, if a leakage of the working oil occurs between the hydraulic pump and the hydraulic motor, the working oil in an amount corresponding to the leakage is automatically supplemented from the supplement pump into the other chamber.

During reverse load operation, the hydraulic motor operates to provide a pumping effect and the hydraulic pump operates to provide a motoring effect. For this reason, the one oil chamber which has been under a higher pressure during normal load operation comes under a lower pressure, while the other chamber which has been under a lower pressure comes under a higher pressure, and the working oil is intended to reversely flow from the other oil chamber toward the supplement pump, but such a reverse flow is blocked by a check valve. As a result, the reverse load transmission from the hydraulic motor to the hydraulic pump is reliably conducted, thus making it possible to provide a good engine brake effect.

Furthermore, if the pair of oil chambers are defined between respective opposed surfaces of the cylinder block including the pump and motor cylinders and the output shaft and a sleeve which are respectively fitted in the central portion of and over the outer peripheral surface of the cylinder block, both the oil chambers can be formed by a mere grooving without axially dividing the cylinder block. Accordingly, the cylinder block is easy to fabricate and is of an extremely high strength to the internal pressure. On the other hand, the sleeve originally has an extremely high strength to the internal pressure. Consequently, deformation of the cylinder block and the sleeve due to the hydraulic pressure can be extremely small to prevent the leakage of the working oil from the inner and outer oil chambers.

The above and other objects, features and advantages of the invention will become apparent from reading of the following description taken in conjunction with the accompanying drawings.

BRIEF DESCRIPTION OF THE DRAWINGS

FIG. 1 is a vertical sectional plan view of a static hydraulic continuously variable transmission carried in a power transmitting system of a motorcycle;

FIG. 2 is a partially vertical sectional back view of the transmission;

FIGS. 3, 4 and 5 are sectional views taken along the lines III—III, IV—IV and V—V in FIG. 1, respectively;

FIG. 6 is a sectional view taken along the line VI—VI in FIG. 2;

FIG. 7 is a partially plan view of the transmission;

FIG. 8 is block diagram of an automatic control circuit in the transmission;

FIG. 9 is a vertical sectional view of details of a static hydraulic continuously variable transmission according to a second embodiment of the present invention;

FIG. 10 is a perspective view of a first (or second) dispensing valve shown in FIG. 9;

FIG. 11 is a perspective view of a clutch valve shown in FIG. 9; and

DESCRIPTION OF THE PREFERRED EMBODIMENTS

Figure 1:
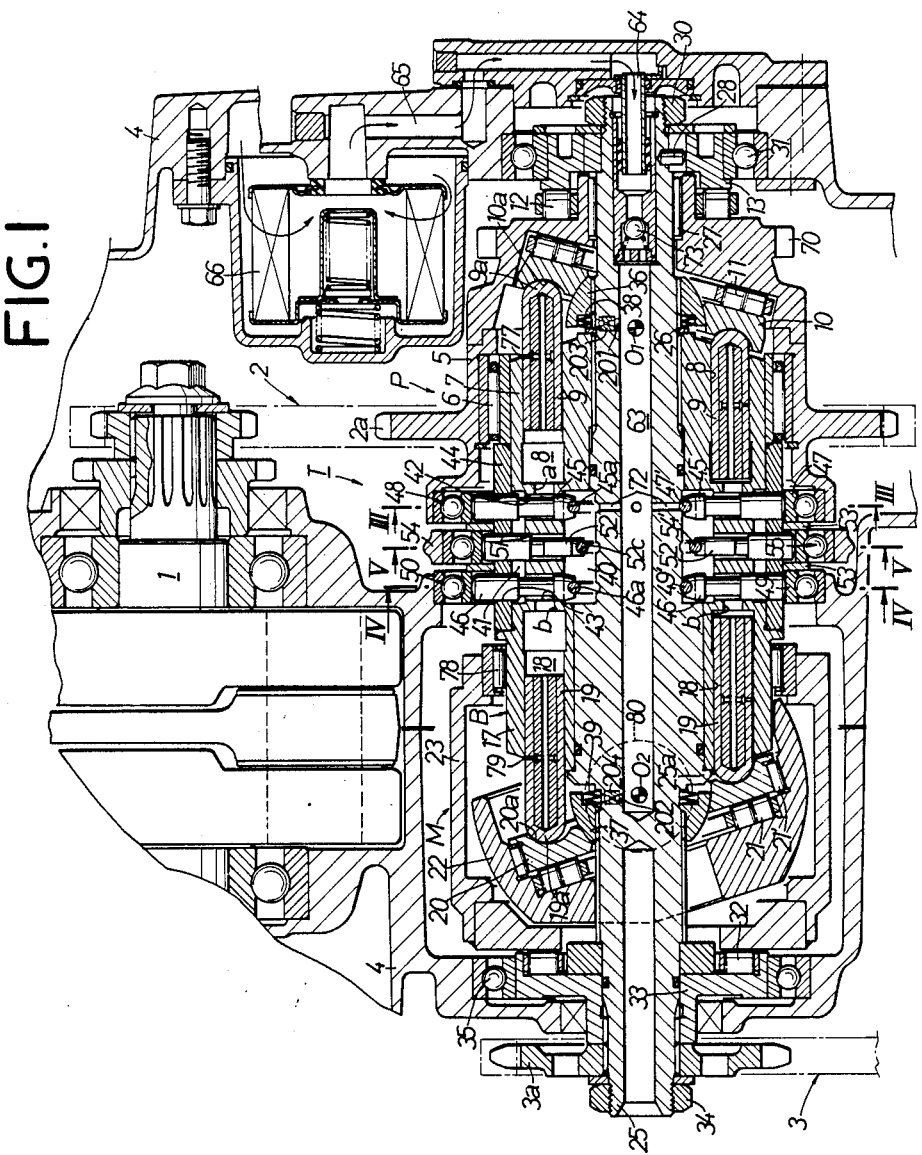
FIGS. 1 to 8 illustrate a first embodiment of the present invention.

Referring first to FIG. 1 illustrating a first embodiment of the present invention, the power of an engine in a motorcycle is transmitted from a crank shaft 1 through a primary chain-type reduction gear 2, a static hydraulic continuously variable transmission T and a secondary chain-type reduction gear 3 to a rear wheel which is not shown.

The continuously variable transmission T comprises a constant capacity swashplate-type hydraulic pump P and a variable capacity swashplate-type hydraulic motor M, and is contained within a casing provided by a crank case 4 which carries the crank shaft 1.

The hydraulic pump p comprises a cup-like input member 5 integrally provided with an input sprocket 2a of the primary reduction gear 2, a pump cylinder 7 relatively rotatably fitted in the inner peripheral wall of the input member 5 through a needle bearing 6, pump plungers 9, 9 . . . slidably fitted in a plurality and odd-number of annularly arranged cylinder bores 8, 8 provided in the pump cylinder 7 to surround the rotational center thereof, and a pump swashplate 10 adapted to abut against the outer ends of the pump plungers 9, 9 . . .

The pump swashplate 10 is rotatably supported at its back surface through thrust roller bearing 11 on the inner end wall of the inner member 5 in an attitude inclined about a phantom trunnion axis 01 perpendicular to the axis of the pump cylinder 7 by a predetermined angle with respect to the axis of the pump cylinder 7, so that during rotation of the input member 5, the pump plungers 9, 9 . . . can be reciprocally moved to provide repeated suction and discharge strokes.

It is to be noted that a spring for biasing the pump plunger 9 toward the expansion thereof may be mounted in compression in the cylinder bore 8 to enhance the ability of the pump plunger 9 to follow the pump swashplate 10.

The back surface of the input member 5 is carried through a thrust roller bearing 12 on a support sleeve 13.

The hydraulic motor M comprises a motor cylinder 17 coaxially disposed leftward from the pump cylinder 7, motor plungers 19, 19 . . . slidably fitted in a plurality and odd-number of annularly arranged cylinder bores 18, 18 . . . respectively provided in the motor cylinder 17 to surround the rotational center thereof, a motor swashplate 20 adapted to abut against the outer ends of the motor plungers 19, 19 . . . , a swashplate holder 22 for carrying the back and outer pheripheral surfaces of the motor swashplate 20 through a thrust roller bearing 21 and a radial roller bearing 21', and a cup-like swashplate anchor 23 for supporting the swashplate holder 22.

The motor swashplate 20 is tiltingly movable between an upright position in which it is located perpendicularly to the axis of the motor cylinder 17 and a tilted position in which it is inclined at a certain angle. In the tilted position, the motor swashplate 20 enables the motor plungers 19, 19 . . . to be reciprocally moved with the rotation of the motor cylinder 17, thereby to provide repeated expansion and contraction strokes.

It should be understood that a spring for biasing the motor plunger 19 so as to be expanded may be mounted in compression in the cylinder bore 18 to enhance the ability of the motor plunger 19 to follow the motor swashplate 20.

The pump cylinders 7 and 17 constitute an integral cylinder block B, and an output shaft 25 is passed through the central portion of the cylinder block B. The motor cylinder 17 is located with its outer end bearing against a flange 25a integrally formed on the outer periphery of the output shaft 25, while the pump cylinder 7 is splined-fitted to the output shaft 25, and a Cir-clip abutting against the outer end of the pump cylinder 7 is locked on the output shaft 25, whereby the cylinder block B is secured on the output shaft 25.

The output shaft 25 is also passed through the input member 5 and carries the member rotatably thereon through a needle bearing 27.

The support sleeve 13 is fitted through a key 28 on the outer periphery at the right end of the output shaft 25 and secured thereon by a nut 30. The output shaft is rotatably journaled at its right end on the crank case 4 through the support sleeve 13 and a roller bearing 31.

In addition, the output shaft 25 is passed through the motor swashplate 20, the swashplate holder 22 and the swashplate anchor 23 at their central portions, and a support sleeve 33 for supporting the back surface of the swashplate anchor 23 through a thrust roller bearing 32 is spline-fitted over the left end of output shaft 25 and is secured thereon together with the input sprocket 31 of the secondary reduction gear 3 by a nut 34. The output shaft 25 is rotatably supported at its left end on the crank case 4 through the support sleeve 33 and a roller bearing 35.

A hemispherical aligning member 36 is slidably fitted over the output shaft 25 and engages the inner peripheral surface of the pump swashplate 10 for relative tilting movement in all directions. The aligning member 36 urges the pump swashplate 10 against the thrust roller bearing 11 by the force of a plurality of Belleville springs 38, thereby constantly providing an aligning effect on the pump swashplate 10.

In addition, a hemispherical aligning member 37 is also slidably fitted over the output shaft 25 and engages the inner peripheral surface of the motor swashplate 20 for relative tilting movement in all directions. The aligning member 37 urges the motor swashplate 20 against the thrust roller bearing 21 by the force of a plurality of Belleville springs 39, thereby constantly providing an aligning effect on the motor swashplate 20.

For the purpose of enhancing the aligning effect on each the swashplates 10 and 20 and also preventing the slipping in the rotational direction between the pump swashplate 10 and each of the pump plungers 9, 9 . . . and between the motor swashplate 20 and each of the motor plungers 19, 19 . . . , spherical recesses 10a and 20a, in which spherical ends 9a and 19a of the corresponding plungers 9 and 19 are engaged, are defined in the swashplates 10 and 20, respectively. In this case, the spherical recess 10a, 20a is formed to have a radius of curvature larger than that of the spherical end 9a, 19a, so that the proper engagement of the swashplate 10, 20 with the spherical end 9a, 19a may be insured even at any rotational position.

A hydraulic closed circuit is formed between the hydraulic pump P and the hydraulic motor M in the following manner.

Provided in the cylinder block B between the cylinder bores 8, 8 . . . of the pump cylinder 7 and the cylinder bores 18, 18 . . . of the motor cylinder 17 are annular inner and outer hydraulic oil chambers 40 and 41 coaxially arranged around the output shaft 25; first and second valve bores 42, 42 . . . and 43, 43 . . . radially penetrating the annular partition wall between both the oil chambers 40 and 41 and the outer pheripheral wall of the outer hydraulic chamber 41, the bores being provided in the same number respectively as the number of the cylinder bores 8, 8 . . . and 18, 18 . . . ; a number of pump ports a, a . . . permitting the intercommunication of the adjacent cylinder bores 8, 8 . . . and first valve bores 42, 42 . . . ; and a number of motor ports b, b . . . permitting the inter-communication of the adjacent cylinder bores 18, 18 . . . and second valve bores 43, 43 . . . . In this case, the inner oil chamber 40 is made by grooving between the respective opposed peripheral surfaces of the cylinder block B and the output shaft 25, while the outer oil chamber 41 is made by grooving between the respective opposed peripheral surfaces of the cylinder block B and the sleeve 44 fitted over and welded to the outer periphery of the cylinder block B.

First dispensing valves 45, 45 . . . are slidably fitted in the first valve bores 42, 42 . . . , respectively, while second dispensing valves 46, 46 . . . are slidably fitted in the second valve bores 43, 43 . . . , respectively.

Each first dispensing valve 45 is formed into a spool type. When the first valve 45 assumes a radially outer position, the corresponding pump port a is brought into communication with the outer oil chamber 41 and out of communication with the inner oil chamber 40, and the corresponding cylinder bore 8 is brought into communication with only the outer oil chamber 41. On the other hand, when the first dispensing valve 45 assumes a radially inner position, the corresponding pump port a is brought into communication with the inner oil chamber 40 and out of communication with the outer oil chamber 41, and the corresponding cylinder bore 8 is brought into communication with only the inner oil chamber 40.

Figure 3:
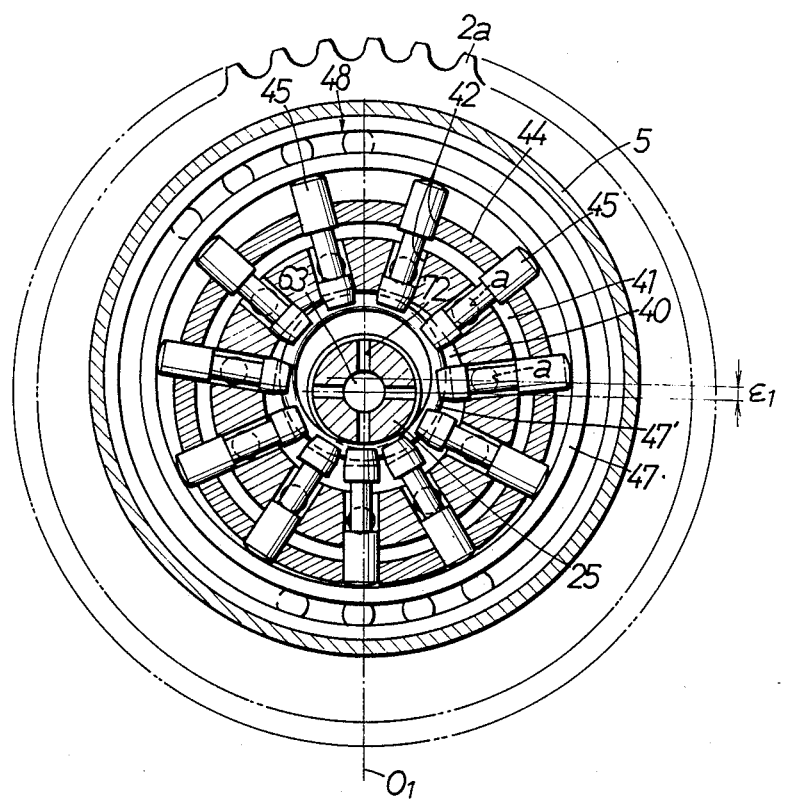

To give such operating action to each first dispensing valve 45, a first eccentric ring 47 is disposed to surround and the outer ends of the first dispensing valves 45, 45 . . . , and a follower ring 47' concentric to the eccentric ring 47 is disposed inside the first dispensing valves 45, 45 . . . and engaged in engagement grooves 45a, 45a . . . at the inner ends thereof (see FIG. 3). The follower ring 47' is formed from a steel wire and has a single cut to repel the first dispensing valves 45, 45 . . . toward the engagement with the first eccentric ring 47.

The first eccentric ring 47 is formed by an inner race of a ball bearing 48 fitted in the input member 5 and is displaced eccentrically by a given distance $\epsilon 1$ from the center of the output shaft 25 along the phantom trunnion axis 01 of the pump swashplate 10, as shown in FIG. 3. Accordingly, when the relative rotation occurs between the input member 5 and pump cylinder 7, each first dispensing valve 45 is reciprocally moved within the valve bore 42 thereof between the outer and inner positions with a stroke twice as long as the eccentric amount $\epsilon 1$ of the first eccentric ring 47.

Each second dispensing valve 46 is formed into a spool type in the same manner as the first dispensing valve 45. When the second dispensing valve 46 assumes a radially outer position in the second valve bore 43, the corresponding motor port b is brought into communication with the outer oil chamber 41 and out of communication with the inner oil chamber 40, and the corresponding cylinder bore 18 is brought into communication with only the outer oil chamber 41, whereas when the second dispensing valve 46 assumes a radially inner position in the second valve bore 43, the corresponding motor port b is brought into communication with the inner oil chamber 40 and out of communication with the inner oil chamber 41, and the corresponding cylinder bore 18 is brought into communication with only the inner oil chamber 40.

Figure 4:
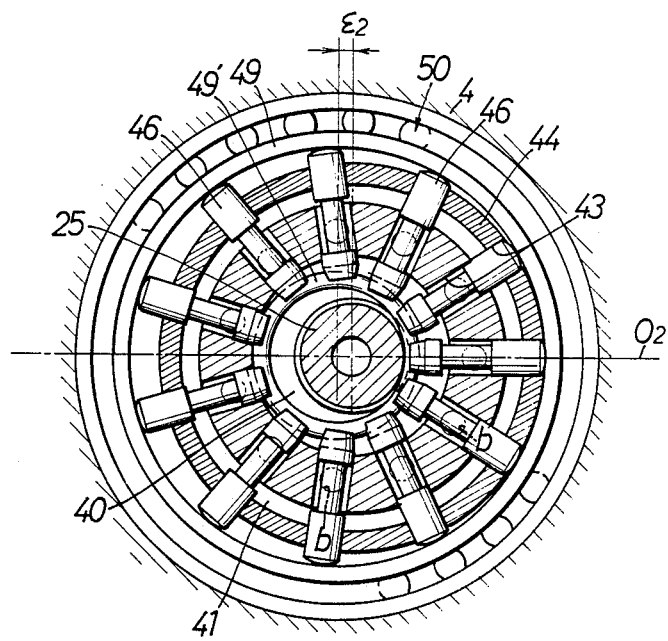

To give such operating action to each first dispensing valve 46, a second eccentric ring 49 is disposed to surround and engage the outer ends of the second dispensing valves 46, 46 . . . , and a follower ring 49' concentric to the eccentric ring 49 is disposed inside the second dispensing valves 46, 46 . . . and engaged in engagement grooves 46a, 46a . . . at the inner ends thereof (see FIG. 4). The follower ring 49' is formed from a steel wire and has a single cut to repel the second dispensing valves 46, 46 . . . toward the engagement with the second eccentric ring 49.

The second eccentric ring 49 is formed by an inner race of a ball bearing 50 fitted in the crank case 4 and is displaced eccentrically by a given distance $\epsilon 2$ from the center of the output shaft 25 along the tilting axis 02 of the motor swashplate 20. Accordingly, when the motor cylinder 17 is rotated, each second dispensing valve 46 is reciprocally moved within the valve bore 43 thereof between the outer and inner positions with a stroke twice as long as the eccentric amount $\epsilon 2$ of the second eccentric ring 49.

Figure 2:
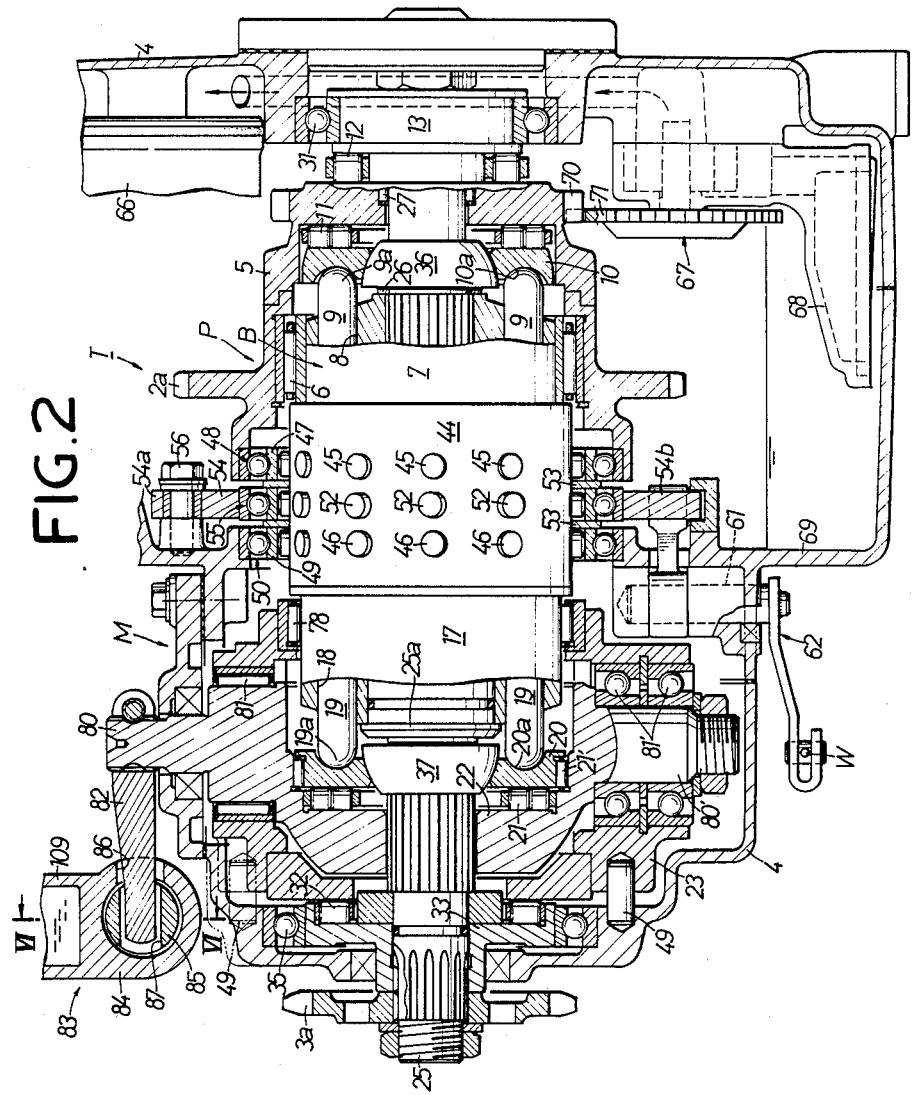

As shown in FIG. 2, a pair of trunnion shafts 80 and 80' are integrally provided at the opposite ends of the swashplate holder 22 to align with the tilting axis 02 of the motor swashplate 20 and rotatably journaled on the swashplate anchor 23 through a needle bearing 81 and a roller bearing 81', respectively. In other words, the tilting axis 02 is defined by these trunnion shafts 80 and 80'.

An operating lever 82 is fixedly mounted on the outer end of one trunnion shaft 80. If the trunnion shaft 80 is turned by the operating lever 82, the swashplate holder 22 integral with the trunnion shaft 80 is also turned and even during rotation of the motor swashplate 20, the swashplate holder can be freely tilted.

The swashplate anchor 23 is supported on the outer periphery of the motor cylinder 17 through a needle bearing 78 and connected to the crank case 4 through a pair of locating pins 49, 49 against the rotation around the output shaft 25.

With the above arrangement, when the input member 5 of the hydraulic pump P is rotated through the primary reduction gear 2, the pump swashplate 10 allows the suction and discharge strokes the pump plunges 9, 9 ..., to alternately perform and the first dispensing valve 45 adjacent to the pump plunger 9 which comes to the suction stroke is moved to the inner position by cooperation of the first eccentric ring 47 with the follower ring 47', while the first dispensing valve 45 adjacent to the plunger 9 which comes to the discharge stroke is moved to the outer position by cooperation of the first eccentric ring 47 and the follower ring 47'. Therefore, each pump plunger 9 operates to suck working oil from the inner hydraulic chamber 40 into the cylinder bore 8 in the suction stroke and to pump the working oil from the cylinder bore 8 into the outer hydraulic chamber in the discharge stroke.

The higher pressure working oil fed into the outer oil chamber 41 is passed into the cylinder bores 18 receiving the motor plungers 19 of the expansion stroke, through the second dispensing valve 48 which are located at the outer position by the second eccentric ring 49 and the follower ring 49', while the working oil within the cylinder bores 18 receiving the motor plungers 19 of the contraction stroke is discharged into the inner oil chamber 40 through the second dispensing valves 46 which are located at the inner position by the second eccentric ring 49 and the follower ring 49'.

During this operation, the cylinder block B is rotated by the sum of a reaction torque received by the pump cylinder 7 from the pump swashplate 10 through the pump plunger 9 which is in the discharge stroke and a reaction torque received by the motor cylinder 17 from the motor swashplate 20 through the motor plunger 19 which is in the expansion stroke, and the rotational torque of the cylinder block B is transmitted from the output shaft 25 to the secondary reduction gear 3.

In this case, the gear shift ratio of the output shaft 25 to the input member 5 is given by the following equation:

$$\text{Gear shift ratio} = 1 + \frac{\text{Capacity of the hydraulic motor } M}{\text{Capacity of the hydraulic pump } P}$$

Therefore, if the capacity of the hydraulic motor M is changed from zero to a certain value, the gear shift ratio can be changed from 1 to a certain required value.

Because the capacity of the hydraulic motor M is determined by the stroke of the motor plunger 19, the gear shift ratio can be controlled in a continuously variable manner from 1 to a certain value by moving the motor swashplate 20 from its upright position to a certain tilted position.

During such an operation of the hydraulic pump P and the hydraulic motor M, the pump swashplate 10 receives a thrust load from the pump plungers 9, 9 ... and the motor swashplate 20 receives a thrust load from the motor plungers 19, 19 ..., these thrust loads acting in the opposite direction to each other. The thrust load received by the pump swashplate 10 is sustained on the output shaft 25 through the thrust roller bearing 11, the input member 5, the thrust roller bearing 12, the support sleeve 13 and the nut 30, while the thrust load received by the motor swashplate 20 is similarly sustained on the output shaft 25 through the thrust roller bearing 21, the swashplate holder 22, the swashplate anchor 23, the thrust roller bearing 32, the support sleeve 33, the sprocket 3a and the nut 34. Accordingly, the thrust loads merely produce a tensile stress to the output shaft 25 and do not act on the crank case 4 carrying the shaft 25 at all.

Figure 5:
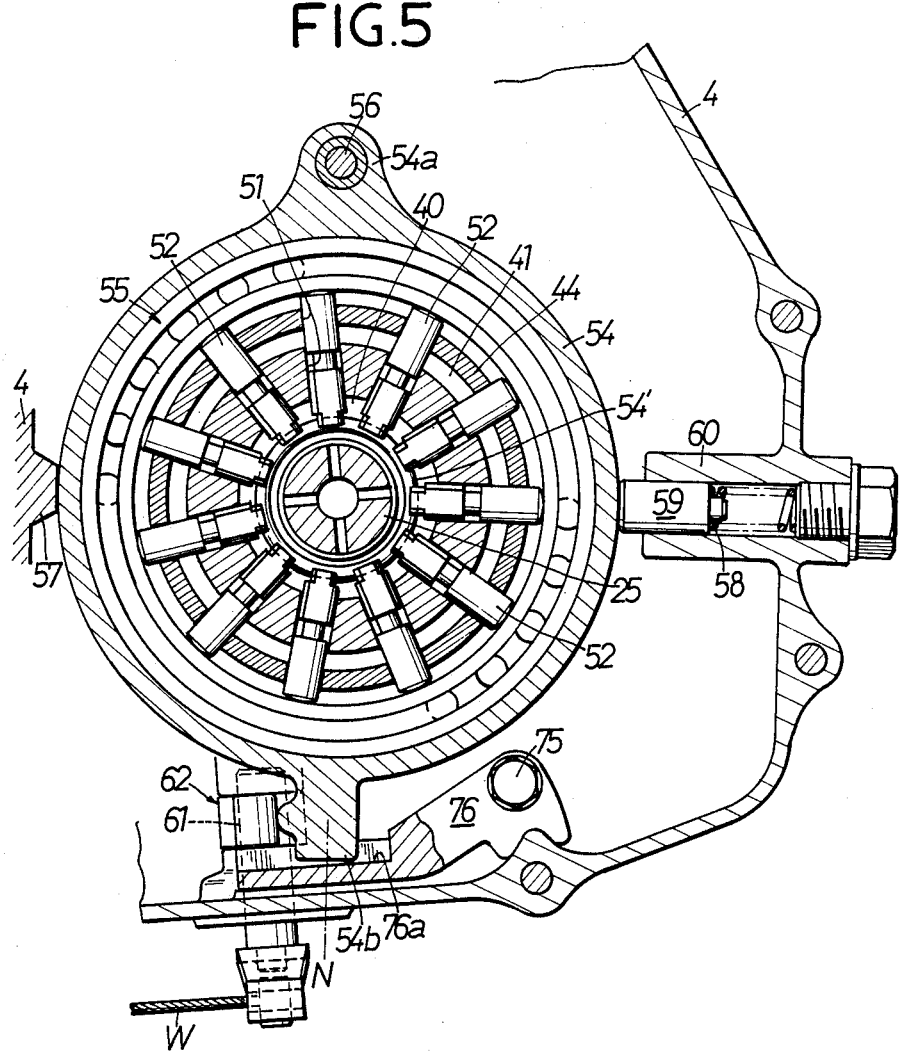

Referring to FIGS. 1 and 5, a plurality of third valve bores 51, 51 ... are perforated in the cylinder block B between the aforesaid first and second valve bores 42, 42 ... and 43, 43 ... to radially penetrate the partition wall between both the aforesaid hydraulic oil chambers 40 and 41 and the sleeve 44, and clutch valves 53, 52 ... are slidably fitted in these valves bores.

Figure 5A:
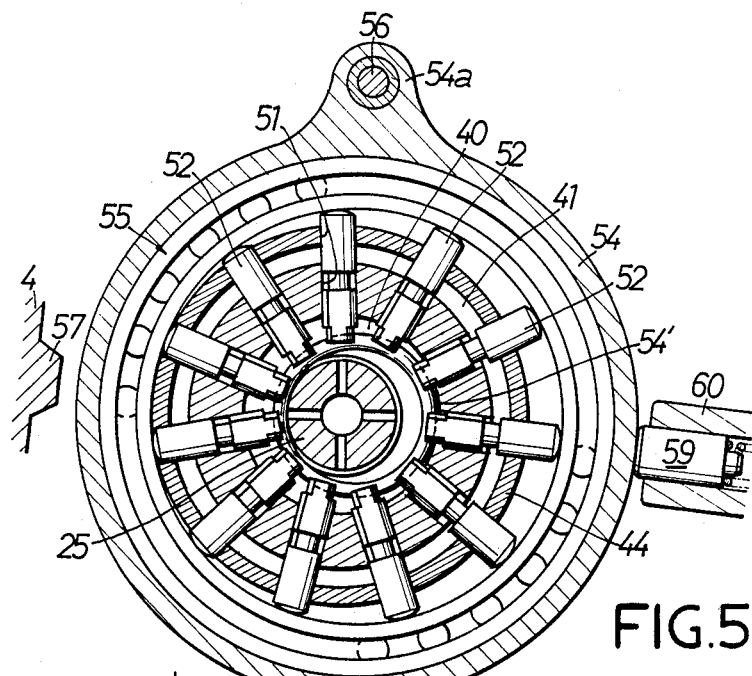
FIG. 5A is an operative view of FIG. 5.
Figure 5B:
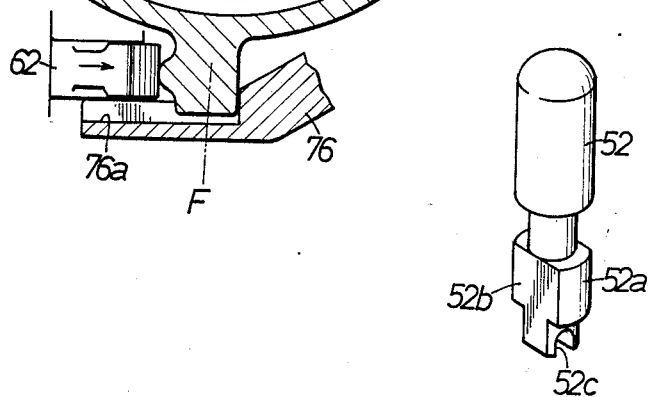
FIG. 5B is a perspective view of a clutch valve shown in FIG. 5.

Each clutch valve 52 is formed into a spool type as shown in FIG. 5B and includes two chamfers 52b and 52b provided on the land portion 52a at the inner end thereof over the entire length of the land portion 52a. When the clutch valve 52 assumes a radially intermediate position or an inner position (clutch ON position) within the third valve bore 51, the third valve bore 52 can be closed to cut off the communication between both the oil chambers 40 and 41, whereas when the clutch valve 52 assumes a radially outer position (clutch OFF position), both the oil chambers 40 and 41 can be brought into communication with each other through the chamfers 52b and 52b.

To control the clutch valves 52, 52 ..., a clutch control ring 54 is disposed to surround and the outer ends of the clutch valves 52, 52 ... through a release bearing 55, to and a follower ring 54' concentric to the clutch control ring 54 is engaged in engagement grooves 52c, 52c ... at the inner ends of the clutch valves 52, 52 ... The follower ring 54' is formed from a steel wire and has a single cut to repel the clutch valves 52, 52 ... toward the engagement with an inner race of the release bearing 55.

The clutch control ring 54 is formed, on the outer surface thereof, with a protruded ear 54a supported through the pivot 56 on the crank case 4 for pivotal movement between a clutch ON position concentric to the output shaft 25 and a clutch OFF position eccentrically displaced with respect to the output shaft 25.

A stopper 57 is integrally formed on the crank case 4 for supporting one side surface of the clutch control ring 54 to limit the clutch ON position N of the clutch control ring, and a piston 59 is slidably fitted in a boss 60 integral with the crank case 4 for urging the other side surface of the clutch control ring 54 toward the stopper 57 by the resilient force of a clutch spring 58.

The clutch control ring 54 is integrally formed with a projection 54b on the outer side surface opposite to the ear 54a. A bell crank lever 62 pivoted at 61 on the crank case 4 has one end connected to the projection 54b and the other end to which a clutch operating wire W is connected.

In order to prevent the clutch control ring from falling sidewardly, the projection 54b is slidably engaged in a guide groove 76a in a guide plate 76 secured to the crank case 4 by a nut 75.

If the projection 54b is pressed through the bell crank lever 62 by drawing the clutch operating wire W, the clutch control ring 54 is swung about the pivot 56 to the clutch OFF position F against the urging force of the piston 59 by the clutch spring 58, as shown in FIG. 5A, and the clutch valves 52, 52 . . . are eccentrically displaced with respect to the axis of the output shaft 25 in cooperation of the release bearing 55 with the follower ring 54'. As a result, several clutch valves 52 close to the piston 59 are moved to the outer positions, i.e., the clutch OFF positions, whereby a short-circuit is produced between the lower pressure inner oil chamber 40 and the higher pressure outer oil chamber 41 through such clutch valves 52, so that a working oil is forced to flow out of the outer oil chamber 41 into the inner oil chamber 40, making it impossible to supply the hydraulic oil to the hydraulic pump P. Thus, the transmission of power can be cut off between the hydraulic pump P and the hydraulic motor M.

If the drawing force of the clutch operating wire W is released, the clutch control ring 54 is returned to the clutch ON position N shown in FIG. 5 by the action of the clutch spring 58 to retain the clutch valves 52, 52 . . . in the positions concentric to the output shaft 25. As a result, the short-circuit between both the oil chambers 40 and 41 is broken off and thus, the transmission of power is restarted from the hydraulic pump P to the hydraulic motor M.

Because the hydraulic pressure of the inner oil chamber always equally acts on the inner ends of all the clutch valves 52, 52 . . . , the urging forces exerted on the clutch control ring 54 by all the clutch valves 52, 52 . . . are balanced. Therefore, the clutch control ring 54 can always be swung smoothly without resistance by the hydraulic pressure of the inner oil chamber 40.

Referring again to FIG. 1, a pair of flange plates 53 and 53 are secured by a smooth snap-in to the outer periphery of the previously described sleeve 44 so as to interposed between the abov-mentioned three bearings 48, 50 and 55. These flange plates 53 and 53 serve not only to avoid mutual interfence of the bearings 48, 50 and 55, but also to reinforce the sleeve 44 firmly, so that deformation of the sleeve 44 due to the higher hydraulic pressure in the outer oil chamber 41 can be suppressed to ensure the smooth operation of each the valves 45, 46 and 52.

In addition, as seen in FIGS. 1 and 2, a blind oil passage 63 is made in the output shaft 25 at its central portion, and an oil feed pipe 64 is inserted into the opened end of the blind oil passage 63 and supported on the side wall of the crank case 4. The oil feed pipe 64 communicates with an oil pan 69 at the bottom of the crank case 4 through an oil passage 65 defined in the side wall of the crank case 4, a filter 66 mounted on such side wall, a supplement pump 67 and a strainer 68, and the supplement pump 67 is driven from the input member 5 through gears 70 and 71. Thus, during rotation of the input member 5, the oil within the oil pan 69 is always supplied into the oil passage 63 by the supplement pump 67.

The oil passage 63 is in communication with the inner oil chamber 40 through a radial supplement hole 72 perforated in the output shaft 25. Further perforated in the output shaft 25 are a first oil feed hole 201 radially extending from the oil passage 63 and opened into the cuplike input member 25 and a second oil passage 202 radially extending from the oil passage 63 and opened into the cuplike swashplate anchor 23. Orifices 203 and 204 are provided in these oil feed holes, respectively. The orifices 203 and 204 permit an appropriate amount of lubricating oil to be supplied from the oil passage 63 to the interiors of the input member 5 and the swashplate anchor 23, particularly the engagement portions between the spherical ends 9a and 19a of the plungers 9 and 19 and the recesses 10a and 20a, while maintaining the discharge pressure of the supplement pump 67. A check valve 73 is provided in the oil passage 63 for preventing the reverse flow of the oil into the oil feed pipe 64.

Thus, if the working oil leaks out of the hydraulic closed circuit between the hydraulic pump P and the hydraulic motor M during normal load operation, the working oil is supplemented from the oil passage 63 via the supplement hole 72 into the inner oil chamber 40.

During reverse load operation, i.e., engine-brake operation, the oil motor M operates to provide a pumping effect and the hydraulic pump P operates to provide a motoring effect. Therefore, the pressure in the outer oil chamber 41 is changed into a lower level and the pressure in the inner oil chamber 40 is changed into a higher level, and the working oil is intended to reversely flow out of the inner oil chamber 40 into the oil passage 63, but such reverse flow is blocked by the check valve 73. Consequently, a reverse load can be reliably transmitted from the hydraulic motor M to the hydraulic pump P, thus providing a good engine brake effect.

For the purpose of lubricating the slide surface of the pump plunger 9 and the interior of the input member 5, a narrow oil hole 77 is perforated in the pump plunger 9 for permitting the communication between the interior and exterior of the pump plunger 9. In addition, for the purpose of lubricating the slide surface of the motor plunger 19 and the interior of the swashplate anchor 23, a narrow oil hole 79 is also perforated in the motor plunger 19 for permitting the communication between the interior and exterior of the motor plunger 19.

Figure 6:
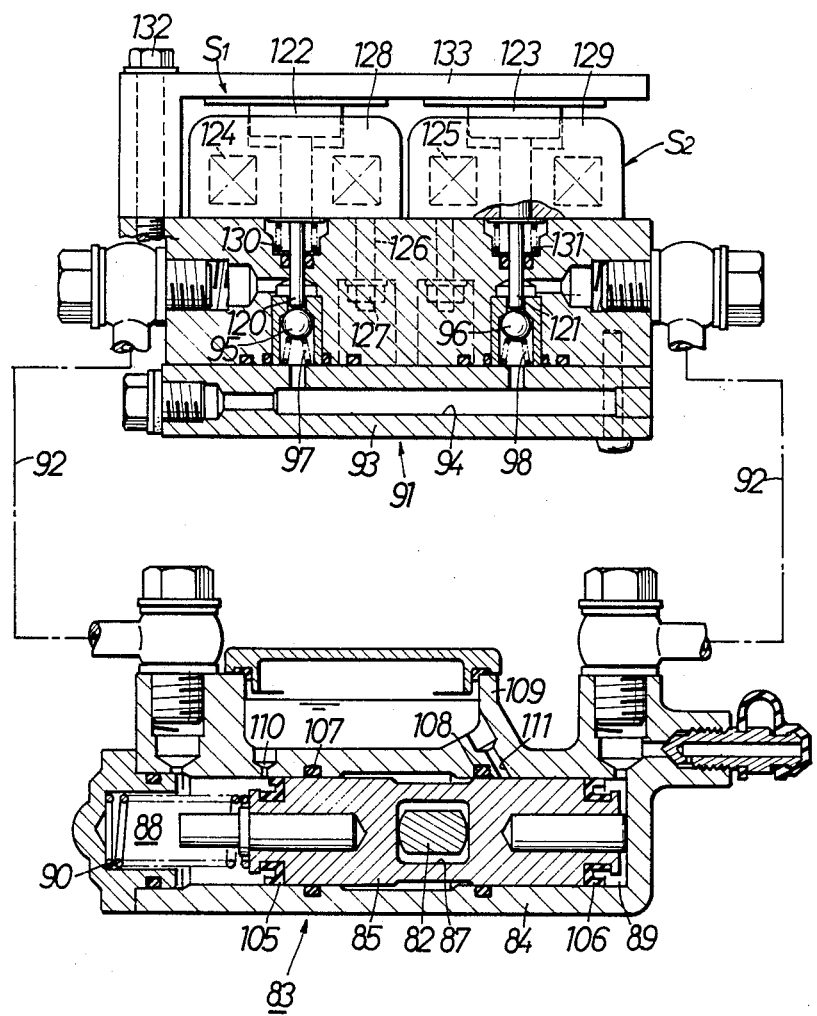
Figure 7:
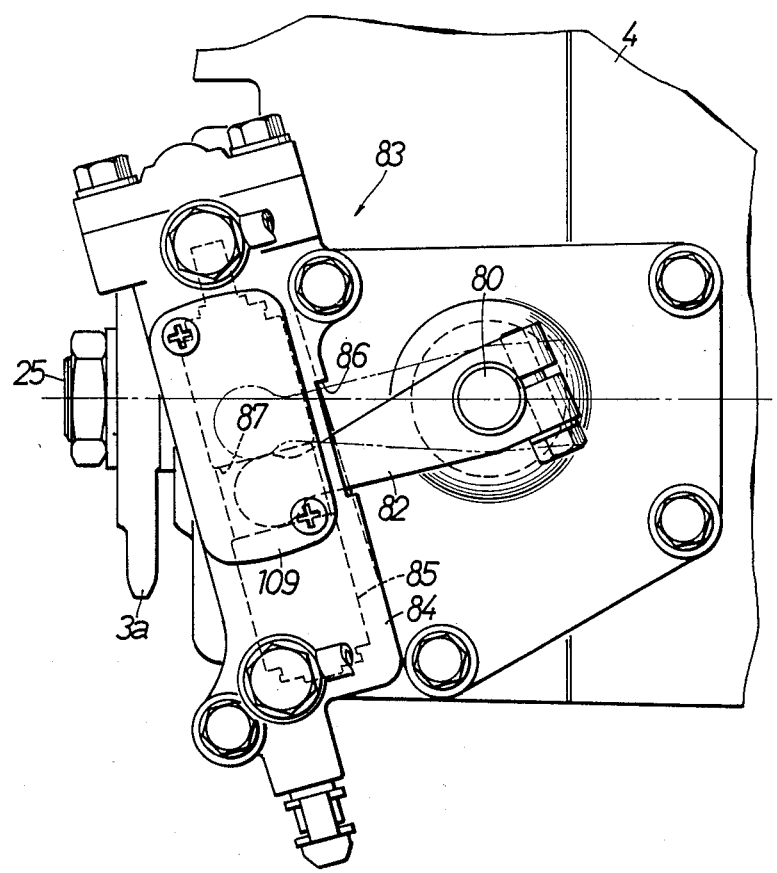

As seen in FIGS. 2, 6 and 7, for the tilting operation of the aforesaid motor swashplate 20, a speed change controller 83 is connected to the operating lever 82 of the trunnion shaft 80.

The speed change controller 83 includes a cylinder 84 secured to the crank case 4 and a piston 85 slidably fitted in the cylinder 84. A window 86 is made in the side wall of the cylinder 84, and a connection hole 87 is made in the central portion of the piston 85 in such a manner as to transversely penetrate the piston and face the window 86. The operating lever 82 of the trunnion shaft 80 is passed through the window 86 and engaged in the connection hole 87, so that piston 85 can be slided in response to the rotation of the trunnion shaft 80.

As seen in FIG. 6, the leftward movement of the operating lever 82 and thus the piston 85 brings the motor swashplate 20 to an upstanding position. A first oil chamber 88 is defined between the piston 85 and the left end wall of the cylinder 84, and a second oil chamber 89 is defind between the piston 85 and the right end wall of the cylinder 84. A return spring 90 is mounted in compression in the first oil chamber 88 for biasing the piston 85 toward the second oil chamber 89.

The first and second oil chambers 88 and 89 are interconnected through a hydraulic conduit 92 having a speed change control valve 91 provided midway thereof and are filled with the working oil.

The speed change control valve 91 comprises a valve box placed at a proper location in a vehicle steering device so as to be interposed in the hydraulic conduit 92, and first and second check valves 95 and 96 mounted in series in the oil passage 94 within the valve box 93. The first and second check valves 95 and 96 are arranged in such a manner to have the directions of normal flow therethrough set opposite to each other and constantly biased toward the opening thereof by valve springs 97 and 98, respectively.

Operating rods 120 and 121 of first and second solenoid actuators S1 and S2 are connected respectively to the first and second check valves 95 and 96 so as to permit the timely forced opening of these valves. The first and second solenoid actuators S1 and S2 are respectively comprised of a movable iron core 122, 123 integrally provided at its fore end with the operating rod 120, 121, a solenoid 124, 125 surrounding the movable iron core 122, 123, an actuator body 128, 129 holding the solenoid 124, 125 and secured to the valve box 93 by a bolt 126 and a nut 127, a return spring 130, 131 for biasing the movable iron core 122, 123 toward the upper inoperative position, and a stopper plate 133 secured to the valve box 93 by a bolt 132 to limit the inoperative position of the movable iron core 122, 123.

In the first and second solenoid actuators S1 and S2, when the solenoid 124, 125 is deenergized, the movable iron core 122, 123 is retained in the inoperative position by the force of the return spring 130, 131, with the operating rod 120, 121 spaced apart from the first and second check valves 95 and 96, whereby the first and second check valves 95 and 96 can be maintained closed. If the solenoid 124, 125 is excited, the movable iron core 122, 123 is moved down against the force of the return spring 130, 131 by the action of the magnetic force, so that the operating rod 120, 121 enables the check valve 95, 96 to be forcedly opened.

Because the number of the motor plungers 19, 19 . . . is odd, the thrust load exerted on the motor swashplate 20 by the motor plungers 19, 19 . . . during rotation of the motor cylinder 17 is alternately changed over in strength between opposite sides of the tilting axis on the motor swashplate 20 as a border, and a vibratory tilting torque acts on the motor swashplate 20. Then, the vibratory titling torque acts, in the form of an alternately rightward or leftward urging force, on the piston 85 through the operating lever 82.

Thereupon, if only the first actuator S1 is operated, the first check valve 95 is brought into an opened state, so that the second check valve 96 permits the flow of the oil from the first oil chamber 88 into the second oil chamber 89, but blocks the flow in the opposite direction. Only when the leftward urging force acts on the piston 85 from the operating lever 82, the oil flows out of the first oil chamber 88 into the second oil chamber 89. As a result, the piston 85 is moved toward the first oil chamber 88 to cause the operating lever 82 to be turned in a direction of tilting down of the motor swashplate 20 and thus, decelerating operation is effected.

Then, upon operating only the second solenoid actuator S2, the second check valve 96 is now brought into an opened state, so that the first check valve 95 permits the flow from the second oil chamber 89 into the first oil chamber, but blocks the flow in the opposite direction. Only when the rightward urging force acts on the piston 85 from the operating lever 82, the oil flows out of the second oil chamber 89 into the first oil chamber 88. As a result, the piston 85 is moved toward the second oil chamber 89 to cause the turning movement of the operating lever 82 in a direction to bring the motor swashplate upright and thus, accelerating operation is effected.

If the solenoid actuators S1 and S2 both are returned to the inoperative states, both the check valves 95 and 96 and closed and completely block the flow passing through the valve box 93 in cooperation, so that the piston 85 becomes immobile. In such position, the operating lever 82 is retained, and the motor swashplate 20 is fixed in the upright or inclined position, thus making it possible to hold the speed change gear ratio, at the current level.

If the solenoid actuators S1 and S2 both are operated, the oil is permitted to freely flow between both the oil chambers 88 and 89. Therefore, if this mode of operation is selected when, for example, the engine is stopped, the piston 85, is rapidly moved to its rightward limit position by the resilient force of the return spring 90 even though it is in the leftward limit position at that time, thus turning the operating lever 82 to a position corresponding to the most inclined position of the motor swashplate 20. This can make preparations for the restarting of a vehicle.

As shown in FIG. 7, the cylinder 84 is disposed in a position vertical or almost vertical to the axis of the output shaft 25. If so, when the operating lever 82 urges the piston 85, the resulting reaction force can be prevented from acting on the swashplate anchor 23 through the trunnion shaft 80 in the axial direction of the output shaft 25.

As seen in FIG. 6, a reserve tank 109 is installed on the cylinder 84, and a relief port 110 and supply port 111 are bored in the upper wall of the cylinder 84 for bringing the reserve tank 109 into communication with the interior of the cylinder 84.

First and second cup seals 105 and 106 in close contact with the inner peripheral surface of the cylinder 84 and having a unidirectional sealing function are mounted respectively on the outer periphery at the left and right ends of the piston 85, and O-rings 107 and 108 in close contact with the outer peripheral surface at an intermediate portion of the piston 85 are mounted on the inner periphery of the cylinder 84 at laterally opposite sides of the window 86.

The relief port 110 is adapted to be opened into the first hydraulic chamber 88 immediately before the first cup seal 105 when the piston 85 is located in its rightward movement limit, and the supply port 111 is adapted to be always opened into the cylinder 84 between the second cup seal 106 and the O-ring 108.

With the piston 85 being located in the rightward movement limit, as the increase in pressure occurs in the first oil chamber 88 due to the increase in oil temperature or the like, the increased pressure is released through the relief port 110 into the reserve tank 109. During the leftward movement of the piston 85, the first oil chamber 88 is pressurized by the piston 85 from the instance when the first cup seal 105 has passed the opening of the relief port 110, thereby enabling the flow of the oil out of the first oil chamber 88 into the second oil chamber 89. In this case, if the second hydraulic chamber 89 is depressurized lower than a predetermined pressure, the difference in pressure between the reserve tank 109 and the second oil chamber 89 causes the oil within the reserve tank 109 to be passed through the slide clearance between the inner surface of the cylinder 84 and the piston 85 and to be supplemented into the second oil chamber 89 while flexing the second cup seal 106 toward the second oil chamber 89.

It should be understood that if the inside of the reserve tank 109 has been maintained at a higher pressure, a pretension force is applied to the hydraulic conduit 92 by the hydraulic pressure and hence, the rigidity of the hydraulic conduit 92 against the variation in hydraulic pressure accompanying the operation of the piston 85, thus enabling the operation of the piston 85 to be stabilized.

Figure 8:
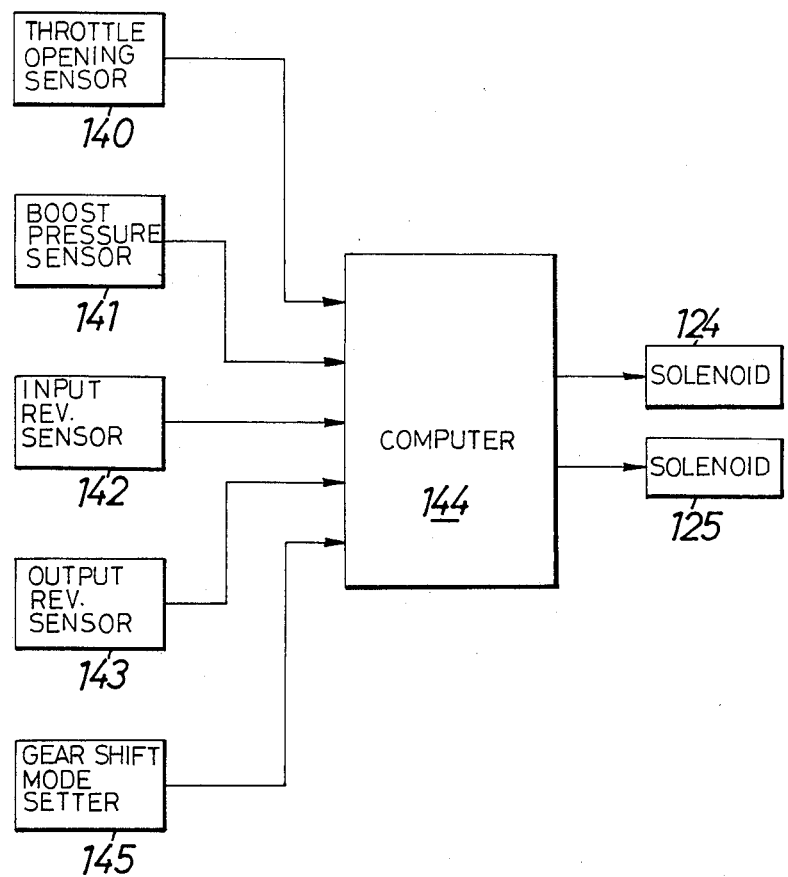

FIG. 8 illustrates one example of an automatic control circuit for the solenoids 124 and 125 of the aforesaid first and second solenoid actuators S1 and S2. In such automatic control circuit, the throttle opening degree and the boost pressure in the engine and the input and output revolutions of the transmission which serve as speed change control factors are detected respectively by a throttle opening degree sensor 140, a boost pressure sensor 141, an input rev. sensor 142 and an output rev. sensor 143, and signals corresponding to the respective detected values are inputted to a computer 144. Thereupon, the computer 144 compares these signals with preprogrammed values, and when having decided to decelerate the transmission T, supplies an operating signal to the solenoid 124 of the first solenoid actuator S1 on the contrary, when having decided to accelerate the transmission, it supplies an operating signal to the solenoid 125 of the second solenoid actuator S2 and further when having decided to hold the speed change ratio, it gives a command to stop outputting signals to either solenoids. In this way, the transmission T is automatically controlled. On the other hand, if the operater operates a gear shift mode setter 145 according to the road condition and the serious considerations of lower specific fuel comsumption and higher power or the like, the increase or decrease in reference value recided by the computer 144 can be provided by the corresponding input signal to freely change the gear shift characteristics.

A second embodiment of the present invention will now be described with reference to FIGS. 9 to 11. The sleeve 44 defining the outer oil chamber 41 is oil-tightly fitted in the outer periphery of the cylinder block B through a pair of seal members, for example, O-rings 150 and 151 and secured thereto by a knock pin 151. Each of the first and second dispensing valves 45 and 46 and the clutch valves 52 is divided into a valve portion 45A, 46A, 52A slidably fitted in that part of the valve bore 42, 43, 51 which in close to the cylinder block B and an operating portion 45B, 46B, 52B slidably fitted in that part of the valve bore 42, 43, 51 close to the sleeve 44. The valve portion 45A, 46A, 52A and the operating portion 45B, 46B, 52B are placed in abutment against each other for sliding movement on each other.

With such arrangement, even if the axis that portion of the valve bore 42, 43, 52 close to the cylinder block B is misaligned somewhat from the axis of that portion of the valve bore 42, 43, 51 close to the sleeve 44 due to the working error, such a misalignment is absorbed by the lateral sliding movement between the valve portion and the operating portion and hence, each valve 45, 46, 52 can smoothly slide within the valve bore 42, 43, 51 causing any gouging on the valve portions. In addition, since each of the operation portions 45B, 46B and 58B can be formed into a sufficiently small diameter, regardless of size of associated valve portion 45A, 46A, 52A, each of the valve bores 42, 43 and 51 can be also formed into a small diameter to diminish the reduction in strength of the sleeve 44 due to provision of the valve bores.

In this case, each of the first and second dispensing valves 45 and 46 has a guide land 45b, 46b which is projected on an intermediate portion of the valve portion 45A, 46A thereof so as to have a partially sectioned circular cross section. The guide land is slidably fitted on each the inner wall of the valve bore 42, 43 (see FIG. 10), and serves to prevent falling of the valve portion 45A, 46A without obstructing the flow of the oil in the valve bores 42 and 43.

Those portions of the valve portion 52A of the clutch valve 52 through which the oil passage is permitted are formed as two chamfer portions 52b as shown in FIG. 11.

The follower rings 47', 49' and 54' respectively engaging the inner ends of the first dispensing valves 45 and 46 and the clutch valves 52 are each formed from a spring steel plate, and washers 152 and 153 are interposed between these follower rings 47', 49' and 54' for avoiding their mutual interference. Each of the follower rings 47', 49' and 54' and the washers 152 and 153 has a notch or a smaller hole made at an appropriate place therein so as not to obstuct the free flow of the oil in the inner oil chamber 40.

The other construction is similar to that in the previously described embodiment, and in FIGS. 9 to 11, the same reference characters and numerals are used to designate the same portions as in the previous embodiment.

Figure 12:
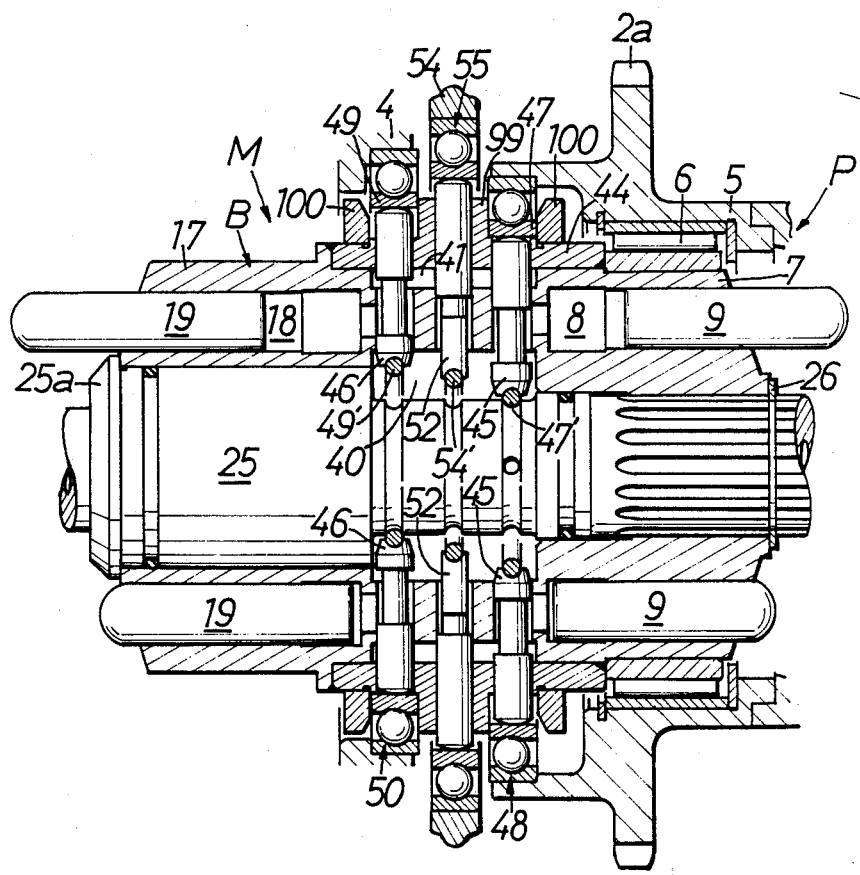
FIG. 12 is a vertical sectional view of details of a static hydraulic continuously variable transmission according to a third embodiment of the present invention.

FIG. 12 illustrates a third embodiment of the present invention. A static hydraulic continuously variable transmission according to the third embodiment is basically of the same construction as in the previous first embodiment, except that an annular reinforcing rib 99 penetrated by the clutch valves 52, 52 ... is integrally provided on the central outer peripheral surface of the sleeve 44 in such a manner to be sandwiched between both the eccentric rings 47 and 49. Moreover, annular reinforcing flange plates 100 are also snapped over and secured to the outer peripheral surface of the sleeve 44 at both ends thereof in such a manner to clamp both the eccentric rings 47 and 49 therebetween, thereby reinforcing the rigidity of the sleeve 44, while at the same time, preventing falling off of both the eccentric rings 47 and 49. In FIG. 12, the same reference characters and numerals are used to denote the same portions as in the first embodiment.

What is claimed is:

1. A static hydraulic continuously variable transmission including a hydraulic closed circuit formed between a swashplate type hydraulic pump and a swashplate type hydraulic motor, wherein:
   a cylinder block comprising a pump cylinder in said hydraulic pump and a motor cylinder in said hydraulic motor which are interconnected is secured to an output shaft;
   a pair of annular oil chambers are concentrically defined around said output shaft between a number of annularly arranged cylinder bores of said pump cylinder and a number of annularly arranged cylinder bores of said motor cylinder;

a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing valves being adapted to be reciprocally moved between radially outer and inner positions to alternately bring the number of cylinder bores of said motor cylinder respectively into communication with said oil chambers;

a common first eccentric ring is engaged with said individual first dispensing valves at positions outside of said cylinder block for imparting the reciprocal movement to said dispensing valves with the relative rotation between said cylinder block and an input member of said hydraulic pump; and a common second eccentric ring is engaged with said individual second dispensing valves at positions outside of said cylinder block for imparting the reciprocal movement to said dispensing valves with the rotation of the cylinder block;

whereby each cylinder bore of said pump cylinder is brought into communication with one of said oil chambers during the discharge stroke thereof and with the other chamber during the suction stroke thereof, while each cylinder bore of said motor cylinder is brought into communication with said one of said oil chambers during the expansion stroke thereof and with said other chamber during the contraction stroke thereof.

2. A static hydraulic continuously variable transmission according to claim 1, wherein the discharge port of a supplement pump is connected to said other oil chamber through a check valve for blocking the issuing of a working oil out of said other chamber.

3. A static hydraulic continuously variable transmission including a hydraulic closed circuit formed between a swashplate type hydraulic pump and a swashplate type hydraulic motor, wherein:

a cylinder block comprising a pump cylinder in said hydraulic pump and a motor cylinder in said hydraulic motor which are interconnected is secured to an output shaft;

a pair of annular oil chambers are concentrically defined around said output shaft between a number of annularly arranged cylinder bores of said pump cylinder and a number of annularly arranged cylinder bores of said motor cylinder;

a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing valves being adapted to be reciprocally moved between radially outer and inner positions to alternately bring the number of cylinder bores of said motor cylinder respectively into communication with said oil chambers;

a common first eccentric ring is engaged with said individual first dispensing valves for imparting the reciprocal movement to said dispensing valves with the relative rotation between said cylinder block and an input member of said hydraulic pump; and a common second eccentric ring is engaged with said individual second dispensing valves for imparting the reciprocal movement to said dispensing valves with the rotation of the cylinder block;

whereby each cylinder bore of said pump cylinder is brought into communication with one of said oil chambers during the discharge stroke thereof and with the other chamber during the suction stroke thereof, while each cylinder bore of said motor cylinder is brought into communication with said one of said oil chambers during the expansion stroke thereof and with said other chamber during the contraction stroke thereof;

wherein said output shaft is fitted in said cylinder block at the central portion thereof, and a sleeve is fitted over the outer peripheral surface of said cylinder block, and wherein said pair of oil chambers are defined between the respective opposed surfaces of said cylinder block, output shaft and sleeve.

4. A static hydraulic continuously variable transmission according to claim 1, wherein at least one of said first and second dispensing valves comprises an operating portion engaging the corresponding first or second eccentric ring and a valve portion provided independently of said operating portion and slidably fitted in the valve bore made in said cylinder block, said valve portion and operating portion slidably abutting against each other.

5. A static hydraulic continuously variable transmission according to claim 1, wherein a follower ring is engaged with the inner ends of each said first and second dispensing valves.

6. A static hydraulic continuously variable transmission according to claim 5, wherein said follower ring is disposed concentrically to the corresponding first or second eccentric ring.

7. A static hydraulic continuously variable transmission including a hydraulic closed circuit formed between a swashplate type hydraulic pump and a swashplate type hydraulic motor, wherein:

a cylinder block comprising a pump cylinder in said hydraulic pump and a motor cylinder in said hydraulic motor which are interconnected is secured to an output shaft;

a pair of annular oil chambers are concentrically defined around said output shaft between a number of annularly arranged cylinder bores of said pump cylinder and a number of annularly arranged cylinder bores of said motor cylinder;

a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing vlaves being adapted to be reciprocally moved between radially outer and inner positions to alternately bring the number of cylinder bores of said motor cylinder respectively into communication with said oil chambers;

a common first eccentric ring is engaged with said individual first dispensing valves for imparting the reciprocal movement to said dispensing valves with the relative rotation between said cylinder block and an input member of said hydraulic pump; and a common second eccentric ring is engaged with said individual second dispensing valves for imparting the reciprocal movement to said dispensing valves with the rotation of the cylinder block;

whereby each cylinder bore of said pump cylinder is brought into communication with one of said oil chambers during the discharge stroke thereof and with the other chanber during the suction stroke thereof, while each cylinder bore of said motor cylinder is brought into communication with said one of said oil chambers during the expansion stroke thereof and with said other chamber during the contraction stroke thereof;

wherein a plurality of clutch valves are radially arranged between said first and second dispensing valves, and a clutch control ring is engaged with the outer ends of the clutch valves, and wherein means are mounted between said first and second eccentric rings and said clutch control ring for preventing mutual interference.

8. A static hydraulic continuously variable transmission including a hydraulic closed circuit formed between a swashplate type hydraulic pump and a swashplate type hydraulic motor, wherein:

a cylinder block comprising a pump cylinder in said hydraulic pump and a motor cylinder in said hydraulic motor which are interconnected is secured to an output shaft;

a pair of annular oil chambers are concentrically defined around said output shaft between a number of annularly arranged cylinder bores of said pump cylinder and a number of annularly arranged cylinder bores of said motor cylinder;

a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing valves being adapted to be reciprocally moved between radially outer and inner positions to alternately bring the number of cylinder bores of said motor cylinder respectively into communication with said oil chambers;

a common first eccentric ring is engaged with said individual first dispensing valves for imparting the reciprocal movement to said dispensing valves with the relative rotation between said cylinder block and an input member of said hydraulic pump; and a common second eccentric ring is engaged with said individual second dispensing valves for imparting the reciprocal movement to said dispensing valves with the rotation of the cylinder block;

whereby each cylinder bore of said pump cylinder is brought into communication with one of said oil chambers during the discharge stroke thereof and with the other chamber during the suction stroke thereof, while each cylinder bore of said motor cylinder is brought into communication with said one of said oil chambers during the expansion stroke thereof and with said other chamber during the contraction stroke thereof;

wherein a follower ring is engaged with the inner ends of each said first and second dispensing valves; and wherein a plurality of clutch valves are radially arranged between said first and second dispensing valves, a clutch control ring being engaged with the outer ends of the clutch valves and a follower ring being engaged with the inner ends of said clutch valves, and means are mounted between the respective follower rings of said first and second dispensing valves and said clutch valves for preventing mutual interference.

9. A static hydraulic continuously variable transmission including a hydraulic closed circuit formed between a swashplate type hydraulic pump and swashplate type hydraulic motor, wherein:

a cylinder block comprising a pump cylinder in said hydraulic pump and a motor cylinder in said hydraulic motor which are interconnected is secured to an output shaft;

a pair of annular oil chambers are concentrically defined around said output shaft between a number of annularly arranged cylinder bores of said pump cylinder and a number of annularly arranged cylinder bores of said motor cylinder;

a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing valves being adapted to be reciprocally moved between radially outer and inner positions to alternately bring the number of cylinder bores of said motor cylinder respectively into communication with said oil chambers;

a common first eccentric ring is engaged with said individual first dispensing valves for imparting the reciprocal movement to said dispensing valves with the relative rotation between said cylinder block and an input member of said hydraulic pump; and a common second eccentric ring is engaged with said individual second dispensing valves for imparting the reciprocal movement to said dispensing valves with the rotation of the cylinder block;

whereby each cylinder bore of said pump cylinder is brought into communication with one of said oil chambers during the discharge stroke thereof and with the other chamber during the suction stroke thereof, while each cylinder bore of said motor cylinder is brought into communication with said one of said oil chambers during the expansion stroke thereof and with said other chamber during the contraction stroke thereof;

wherein said output shaft is fitted in said cylinder block at the central portion thereof, and a sleeve is fitted over the outer peripheral surface of said cylinder block, and wherein said pair of oil chambers are defined between the respective opposed surfaces of said cylinder block, output shaft and sleeve;

wherein a plurality of clutch valves are radially arranged between said first and second dispensing valves, and that portion of said sleeve which is penetrated by said clutch valves is in the form of a reinforcing rib, and further, a pair of reinforcing means are secured to the outer peripheral surface of said sleeve in such a manner to clamp said first and second eccentric rings therebetween from the outside.

10. A static hydraulic pressure type continuously variable transmission comprising:
a hydraulic pump having a pump cylinder;
a hydraulic motor having a motor cylinder;
a hydraulic closed circuit between said hydraulic pump and motor; and
a transmission shaft;
said pump cylinder and said motor cylinder being integrally connected with each other to form a cylinder block which is disposed on said transmission shaft;
wherein a pair of annular oil chambers are defined concentrically around said transmission shaft between a number of cylinder bores annularly arranged in said pump cylinder and a number of cylinder bores annularly arranged in said motor cylinder;
wherein a number of first dispensing valves are radially arranged and are reciprocatingly movable between respective radial inner and radial outer positions so as to alternately connect said number of cylinder bores of said pump cylinder with said pair of annular oil chambers, respectively, and a number of second dispensing valves are radially arranged and are reciprocatingly movable between respective radial inner and radial outer positions so as to alternately connect said number of cylinder bores of said motor cylinder with said pair of annular oil chambers, respectively; and
wherein a first common eccentric ring is in engagement with said first dispensing valves at positions outside of said cylinder block for imparting reciprocating motions to the first dispensing valves in response to relative rotations between said hydraulic pump and an input member, and a second common eccentric ring is in engagement with said second dispensing valves at positions outside of said cylinder block for imparting reciprocating motions to the second dispensing valves in response to rotations of said cylinder block;
said cylinder bores of the pump cylinder being communicated with one of said pair of annular oil chambers during discharge strokes thereof and with the other annular oil chamber during suction strokes thereof, said cylinder bores of the motor cylinder being communicated with said one of said pair of annular oil chambers during expansion strokes thereof and with said other annular oil chamber during contraction strokes thereof.

11. A static hydraulic pressure type continuously variable transmission according to claim 10, further comprising a supplement pump having a discharge port, said other annular oil chamber being communicated with said discharge port of said supplement pump via a check valve, which check valve blocks operation oil from flowing out of said other annular oil chamber.

12. A static hydraulic pressure type continuously variable transmission comprising:
a hydraulic pump having a pump cylinder;
a hydraulic motor having a motor cylinder;
a hydraulic closed circuit between said hydraulic pump and motor; and
a transmission shaft;
said pump cylinder and said motor cylinder being integrally connected with each other to form a cylinder block which is disposed on said transmission shaft;
wherein a pair of annular oil chambers are defined concentrically around said transmission shaft between a number of cylinder bores annularly arranged in said pump cylinder and a number of cylinder bores annularly arranged in said motor cylinder;
wherein a number of first dispensing valves are radially arranged and are reciprocatingly movable between respective radial inner and radial outer positions so as to alternately connect said number of cylinder bores of said pump cylinder with said pair of annular oil chambers, respectively, and a number of second dispensing valves are radially arranged and are reciprocatingly movable between respective radial inner and radial outer positions so as to alternately connect said number of cylinder bores of said motor cylinder with said pair of annular oil chambers, respectively; and
wherein a first common eccentric ring is in engagement with said first dispensing valves for imparting reciprocating motions to the first dispensing valves in response to relative rotations between said hydraulic pump and an input member, and a second common eccentric ring is in engagement with said second dispensing valves for imparting reciprocating motions to the second dispensing valves in response to rotations of said cylinder block;
said cylinder bores of the pump cylinder being communicated with one of said pair of annular oil chambers during discharge strokes thereof and with the other annular oil chamber during suction strokes thereof, said cylinder bores of the motor cylinder being communicated with said one of said pair of annular oil chambers during expansion strokes thereof and with said other annular oil chamber during contraction strokes thereof;
wherein a plurality of clutch valves are arranged radially between said first and second dispensing valves and a clutch control ring is in engagement with respective outer ends of said clutch valves, and wherein means are provided between said first eccentric ring, said second eccentric ring and said clutch control ring for preventing mutual interference therebetween.

13. A static hydraulic pressure type continuously variable transmission comprising:
a hydraulic pump having a pump cylinder;
a hydraulic motor having a motor cylinder;
a hydraulic closed circuit between said hydraulic pump and motor; and
a transmission shaft;
said pump cylinder and said motor cylinder being integrally connected with each other to form a cylinder block which is disposed on said transmission shaft;
wherein a pair of annular oil chambers are defined concentrically around said transmission shaft between a number of cylinder bores annularly arranged in said pump cylinder and a number of cylinder bores annularly arranged in said motor cylinder;
wherein a number of first dispensing valves are radially arranged and are reciprocatingly movable between respective radial inner and radial outer positions so as to alternately connect said number of cylinder bores of said pump cylinder with said pair of annular oil chambers, respectively, and a number of second dispensing valves are radially arranged and are reciprocatingly movable between respective radial inner and radial outer positions so as to alternately connect said number of cylinder bores of said motor cylinder with said pair of annular oil chambers, respectively; and wherein a first common eccentric ring is in engagement with said first dispensing valves at positions outside of said cylinder block for imparting reciprocating motions to the first dispensing valves, and a second common eccentric ring is in engagement with said second dispensing valves at positions outside of said cylinder block for imparting reciprocating motions to the second dispensing valves;

said cylinder bores of the pump cylinder being communicated with one of said pair of annular oil chambers during discharge strokes thereof and with the other annular oil chamber during suction strokes thereof, said cylinder bores of the motor cylinder being communicated with said one of said pair of annular oil chambers during expansion strokes thereof and with said other annular oil chamber during contraction strokes thereof.

14. A static hydraulic pressure type continuously variable transmission comprising:
a hydraulic pump having a pump cylinder;
a hydraulic motor having a motor cylinder;
a hydraulic closed circuit between said hydraulic pump and motor; and
a transmission shaft;
said pump cylinder and said motor cylinder being integrally connected with each other to form a cylinder block which is disposed on said transmission shaft;
wherein said hydraulic closed circuit is formed integral with said cylinder block and includes a high pressure oil chamber and a low pressure oil chamber, said high and low pressure oil chambers being communicated with a number of cylinder bores arranged in said pump cylinder and a number of cylinder bores arranged in said motor cylinder, respectively, via a dispensing valve arrangement; and
wherein said dispensing valve arrangement includes dispensing valves which are disposed separately for the motor and the pump so as to be rotatable in response to rotation of the cylinder block and are operable to alternately communicate said pump cylinder bores and said motor cylinder bores with said high pressure oil chamber and said low pressure oil chamber, respectively, said dispensing valves projecting outside of said cylinder block and at projected parts thereof engaging with and being driven by a dispensing valve driving means which is disposed outside of the cylinder block.

15. A static hydraulic pressure type continuously variable transmission according to claim 14, wherein said high and low pressure oil chambers are formed annularly and one of the chambers encircles the other, and wherein said dispensing valves are reciprocatingly movable between said annular high and low pressure oil chambers.

16. A static hydraulic pressure type continuously variable transmission according to claim 15, wherein said annular high and low pressure oil chambers are disposed concentrically with respect to said transmission shaft and said dispensing valves are adapted to reciprocate between a radial outer position and a radial inner position in said cylinder block.

17. A static hydraulic pressure type continuously variable transmission according to claim 16, wherein said dispensing valve driving means comprises eccentric rings which are disposed eccentrically with respect to the axis of said cylinder block.

18. A static hydraulic pressure type continuously variable transmission according to claim 16, wherein said dispensing valves are disposed radially and said dispensing valve drive means comprises eccentric rings which are disposed eccentrically with respect to the axis of said cylinder block.

19. A static hydraulic pressure type continuously variable transmission according to claim 14, wherein said dispensing valve driving means drives said dispensing valves disposed separately for the motor and the pump in such a manner that through operation of the valves the pump cylinder bores are communicated with said high pressure oil chamber during discharge strokes thereof and with said low pressure oil chamber during suction strokes thereof while said motor cylinder bores are communicated with said high pressure oil chamber during expansion strokes thereof and with said low pressure oil chamber during contraction strokes thereof.

20. A static hydraulic pressure type continuously variable transmission according to claim 19, wherein said high and low pressure oil chambers are formed annularly and one of the chambers encircles the other, and wherein said dispensing valves are reciprocatingly movable between said annular high and low pressure oil chambers.

21. A static hydraulic pressure type continuously variable transmission according to claim 20, wherein said dispensing valves are adapted to reciprocate between a radial outer position and a radial inner position in said cylinder block.

22. A static hydraulic continuously variable transmission including a hydraulic closed circuit formed between a swashplate type hydraulic pump and a swashplate type hydraulic motor, wherein:
a cylinder block comprising a pump cylinder in said hydraulic pump and a motor cylinder in said hydraulic motor which are interconnected is secured to an output shaft;
a pair of annular oil chambers are concentrically defined around said output shaft between a number of annularly arranged cylinder bores of said pump cylinder and a number of annularly arranged cylinder bores of said motor cylinder;
a number of first dispensing valves and a number of second dispensing valves are radially arranged respectively, said first dispensing valves being adapted to be reciprocally moved between radially outer and inner positions to alternately bring the number of cylinder bores of said pump cylinder respectively into communication with said oil chambers, and said second dispensing valves being adapted to be reciprocally moved between radially outer and inner positions to alternately bring the number of cylinder bores of said motor cylinder respectively into communication with said oil chambers;
a common first eccentric ring is engaged with said individual first dispensing valves for imparting the reciprocal movement to said dispensing valves with the relative rotation between said cylinder block and an input member of said hydraulic pump; and a common second eccentric ring is engaged with said individual second dispensing valves for imparting the reciprocal movement to said dispensing valves with the rotation of the cylinder block;

whereby each cylinder bore of said pump cylinder is brought into communication with one of said oil chambers during the discharge stroke thereof and with the other chamber during the suction stroke thereof, while each cylinder bore of said motor cylinder is brought into communication with said one of said oil chambers during the expansion stroke thereof and with said other chamber during the contraction stroke thereof;

wherein a follower ring is engaged with the inner ends of each said first and second dispensing valves, said follower ring being disposed concentrically to the corresponding first or second eccentric ring;

wherein a plurality of clutch valves are radially arranged between said first and second dispensing valves, a clutch control ring being engaged with the outer ends of and a follower ring being engaged with the inner ends of said clutch valves, and means are mounted between the respective follower rings of said first and second dispensing valves and said clutch valves for preventing the mutual interference.

23. A static hydraulic pressure type continuously variable transmission comprising:
a hydraulic pump having a pump cylinder;
a hydraulic motor having a motor cylinder;
a hydraulic closed circuit between said hydraulic pump and said hydraulic motor; and
a transmission shaft;
said pump cylinder and said motor cylinder being integrally connected with each other to form a cylinder block and said cylinder block being disposed on said transmission shaft;
wherein said hydraulic closed circuit includes a pair of oil chambers, said oil chambers being in communication with a number of cylinder bores arranged in said pump cylinder and a number of cylinder bores arranged in said motor cylinder, respectively, via a dispensing valve arrangement;
wherein said dispensing valve arrangement includes dispensing valves which are operable to alternately communicate said pump cylinder bores and said motor cylinder bores with each of said oil chambers, said dispensing valves being driven by a dispensing valve driving means; and wherein said dispensing valves engage with and are driven by the dispensing valve driving means at positions outside of the cylinder block.

24. A static hydraulic pressure type continuously variable transmission according to claim 23, wherein said dispensing valves project outside of the cylinder block and at projected parts thereof are driven by said driving means.

25. A hydraulically operated power transmission system comprising a swashplate type hydraulic pump and a swashplate type hydraulic motor, each of the pump and the motor including a cylinder having a number of cylinder bores annularly arranged therein, a number of plungers each slidably received in one of the cylinder bores, and a swashplate engaging those ends of the plungers which protrude from the cylinder bores,
wherein a low pressure oil chamber and a high pressure oil chamber are defined in the cylinders in a manner distanced from each other,
wherein the transfer of a working oil between the cylinder bores and the low and high pressure oil chamber is carried out during relative rotation between the cylinders and a member supporting one of the swashplates,
wherein a plurality of dispensing valves are provided in each cylinder in a radially arranged configuration for reciprocation between radially outer and inner positions to permit the respective cylinder bores to alternately communicate with the low and high pressure oil chambers,
wherein a dispensing valve driving means is provided to cause the dispensing valves to reciprocate interlockingly with the relative rotation between the one cylinder and the swashplate supporting member, and
wherein the dispensing valves engage with and are driven by the dispensing valve driving means at positions outside of the cylinders.

26. A hydraulically operated power transmission system according to claim 25, wherein the dispensing valves project outside of the cylinders and at projected parts thereof are driven by the dispensing valve drive means.

27. A hydraulically operated power transmission system according to claim 25, wherein the system is applied to a static hydraulic pressure type continuously variable transmission.

28. A hydraulically operated power transmission system according to claim 26, wherein the system is applied to a static hydraulic pressure type continuously variable transmission.

* * * * *